Aug. 14, 1951
J. G. LINDEMAN
2,564,164
HYDRAULIC TRANSMITTER-MOTOR UNIT
Filed Aug. 9, 1948
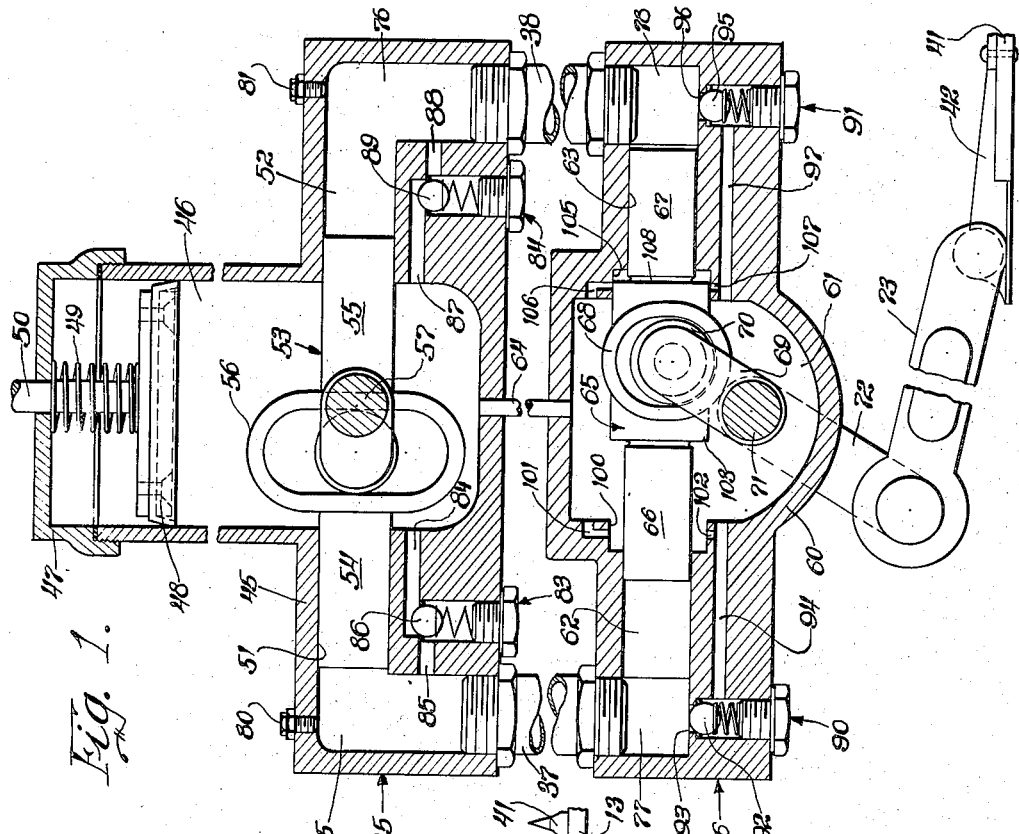
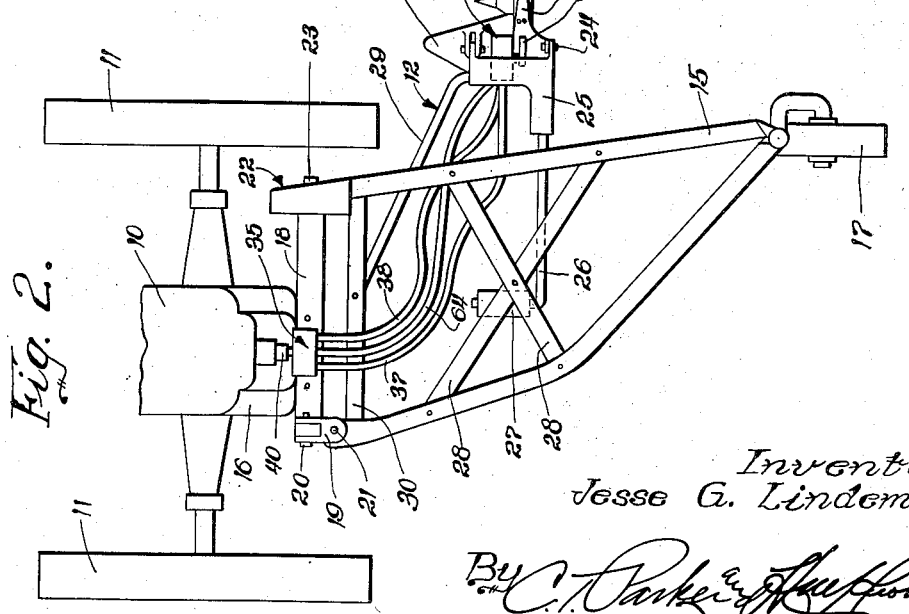
Inventor:
Jesse G. Lindeman Patented Aug. 14, 1951

2,564,164

UNITED STATES PATENT OFFICE 2,564,164

HYDRAULIC TRANSMITTER-MOTOR UNIT

Jesse G. Lindeman, Yakima, Wash., assignor, by mesne assignments, to Deere & Company, Moline, Ill., a corporation of Illinois Application August 9, 1948, Serial No. 43,180

5 Claims. (Cl. 60—54.5)

This invention relates to a fluid-pressure drive system and more particularly to a hydraulic driving system of the type in which fluid pressure developed by a double-acting reciprocating piston is transmitted to a motor for reciprocating a double-acting piston in the motor. Still more particularly, the invention relates to the adaptation of such system to convert rotary motion into reciprocating motion, as in the case of a mower or like machine.

One of the principal features of the invention resides in the provision of a system comprising a pump or transmitter unit and a motor unit, each including a pair of opposed cylinders and each including a double-ended piston carried for reciprocation in the associated pair of cylinders, with the end portion of one piston operating in one cylinder and the opposite end portion operating in the opposite cylinder, the transmitter cylinders being respectively connected to the motor cylinders by means of fluid-pressure-transmitting conduits so that the system includes two independent closed fluid circuits, whereby reciprocation of the transmitter piston will effect reciprocation of the motor piston. Another object of the invention is the provision of a fluid reservoir connected to the separate circuits in such manner that the fluid in these circuits may be replenished from time to time as the normal pressure or volume in such circuits diminishes because of leakage, for example. It is still another feature of the invention to connect the circuits to the reservoir by over-load or pressure-relief valves operative in response to abnormally high pressures developed in such circuits so that the pressure in excess of normal may be exhausted to the reservoir. It is in connection with this feature of the invention that the replenishing means operates to maintain the circuits at their normal fixed volumes. A still further feature of the invention resides in means for normally maintaining a quantity of fluid under pressure in the reservoir so that when the pressure in either circuit falls below that in the reservoir, the replenishing means operates to supply an additional quantity of fluid to that circuit to make up the deficiency. In a preferred form of the invention, the pump and motor are provided with separate interconnected reservoirs.

In the adaptation of a system of this type for the purpose of driving the cutter of a mower or the like, it is recognized that the ordinary mower or like machine is driven by some form of mechanical power train including belts, pulleys, shafts, gears or chains, as in the case of a tractor mower in which the cutter bar is driven by a mechanical train connected to the tractor power take-off shaft. In the case of a trail-behind or horse-drawn mower, the drive to the cutter bar is accomplished by a mechanical power train connected to one of the driving wheels. In either case, the reciprocation of the cutter bar is effected at relatively high speeds and the mower and the carrying structure to which it is connected must be constructed to accommodate the vibration due to reciprocation, which is of considerable magnitude. According to the present invention, it is an object to utilize a hydraulic system in place of a mechanical system, thereby achieving many advantages and eliminating many disadvantages, particularly those due to such peculiarities of mower construction as require a relatively large degree of flexibility between the cutter bar and the carrying structure. In the case of a mower driven by a mechanical power train, provision must be made in the power train for accommodating such flexibility, such provision usually including necessary universal joints and telescopic shafting, for example. Further, the magnitude of the vibration due to reciprocation of the cutter or sickle may be minimized in the use of a fluid drive, since the moving parts may be hydraulically cushioned.

The invention resides in the foregoing objects and features and in other combinations and arrangements of parts as will more readily appear in the accompanying drawing and specification and claims appended hereto.

In the drawing, wherein a preferred form and preferred adaptation of the invention are illustrated by way of example:

Figure 1 is a sectional and condensed view of the hydraulic drive system; and

Figure 2 is a plan view, which is largely schematic, of a tractor-connected mower utilizing the hydraulic unit shown in Figure 1.

The schematic illustration of the mower in Figure 2 is based on the disclosure of the U. S. patent to Paradise 2,171,761; however, any other representative type of mower may be modified to adapt the present invention thereto. In the present illustration, the mower is of the type connected to and supported in part on a vehicle, such as a tractor having a main body 10 supported on a pair of transversely spaced traction wheels 11. The mower is designated generally by the numeral 12 and is positioned rearwardly of the tractor. The mower includes cutting mechanism having a laterally extending cutter bar 13 provided with an inner ground-engaging shoe 14.

The cutting mechanism further includes supporting structure by means of which the mower is carried on carrying structure, which, in the present case, includes both the tractor and a rearwardly extending frame 15. The forward end of the frame is supported on draft or supporting structure on the tractor, such as the tractor drawbar as indicated at 16. The rear end of the frame 15 is carried on a single caster wheel 17.

The means for supporting the forward end of the frame 15 on the tractor drawbar 16 includes a transverse frame member 18 having at the left hand end thereof a clevis 19 which provides a first pivot 20 on a horizontal axis and a second pivot 21 on a vertical axis. The connection between the forward end of the frame 15 and the right hand end of the frame member 18 includes a releasable latch designated generally by the numeral 22. This latch may be of any conventional construction and has not been illustrated in detail. As is ordinarily the case with such latches, there is included in the latch a pivot 23 on a horizontal axis coaxial with the pivot axis of the pivot 20. According to the construction just decribed, the mower frame 15 is free to float about the pivot axis 20—23 as the wheels 11 and 17 encounter varying ground contour. The shoe 14 of the cutter bar 13 is connected on a longitudinal horizontal axis at 24 to a yoke 25 which is provided at the outer end of a laterally extending supporting arm or coupling bar 26, the inner end of which is carried in a bearing 27 rigidly supported on a pair of crossed members 28 included in the frame 15. The bearing 27 provides a longitudinal horizontal pivot. The cutter bar 13 thus has flexibility with respect to the frame 15 about the horizontal longitudinal pivots 24 and 27. On the other hand, the cutter bar is connected to the frame 15 in longitudinally fixed relation with respect thereto, part of the means accomplishing this result comprising the arm 26 and another part of such means comprising a rigid connecting link 29 which interconnects the yoke 25 and a transverse bar 30 extending across forward portions of the frame 15. The releasable latch mechanism 22 normally holds the cutter bar and frame 15 in the position illustrated. However, in the event that the cutter bar encounters an obstacle impeding its forward travel, the latch mechanism may release, thus allowing the frame 15, together with the cutter bar 13 and its supporting structure, to swing rearwardly about the vertical pivot 21, a result that is familiar to those skilled in the art and one that is treated here for the purpose of characterizing the requirement of flexibility in a mower and thus emphasizing the importance in such construction of the use of a system including the unit shown in Figure 2, a description of which will follow.

Briefly, the fluid system includes a pump or transmitter unit 35 and a motor unit 36 interconnected by a pair of separate fluid-pressure-transmitting conduits 37 and 38. In the adaptation of the fluid driving system to a mower such as that illustrated, the transmitter unit 35 will be preferably located on the tractor or some rigid frame part associated therewith; and the motor unit will be preferably located on the mower, particularly the cutter bar of the cutting mechanism. In the present case, the unit 35 is shown as being carried on the transverse frame member 18 directly behind the tractor, and the unit 36 is shown as being mounted on the inner shoe 14. The tractor 10 illustrated here has, like the conventional tractor, a rearwardly extending power take-off shaft, designated generally by the numeral 40. As will be hereinafter brought out, the power developed by this rotary shaft is utilized to obtain reciprocation of piston means in the unit 35. The cutting mechanism is provided with a reciprocating cutter or sickle 41 which has a cutter or knife head 42 in close proximity to the motor unit 36. As will be described below, reciprocation of a piston means in the motor 36 is utilized to impart reciprocation to the cutter or knife 41.

In the preferred form of the invention illustrated in Figure 2, the unit 35 comprises a housing 45 including a fluid reservoir 46 which is preferably cylindrical and normally closed by a removable cover 47. Fluid contained in the reservoir 46 is normally maintained under pressure, and the means for accomplishing this may be in the form of a plunger 48 biased or loaded by a compression spring 49 which surrounds a stem 50 connected to the plunger 48 and guided into an aperture in the cap or cover 47. The transmitter includes a pair of opposed cylinders 51 and 52, these cylinders preferably being coaxial on opposite sides of the central reservoir 46. A double-ended piston, indicated generally by the numeral 53, is carried by the housing 45 for reciprocation in the cylinders 51, the piston 53 having opposite ends or plungers 54 and 55 which operate respectively in the cylinders 51 and 52. The means for converting the high speed rotation of the tractor power take-off shaft 40 to reciprocation of the piston 53 comprises a yoke 56 preferably formed integrally with the piston 53 and intermediate the plunger end portions 54 and 55. A shaft 57 is journaled in the housing 45 and may be carried in bearings of any appropriate construction, the axis of the shaft 57 being normal to the axis of reciprocation of the piston 53. When the unit 35 is mounted in place on the frame member 18, the shaft 57 is coaxial with and connected to the tractor power take-off shaft 40, the connection therebetween being accomplished in any suitable manner, the details of which need not be illustrated or described here.

The general design of the motor unit 36 follows that of the unit 35, at least to the extent that the motor unit is preferably in the form of a housing 60 having a reservoir portion 61 and a pair of opposed cylinders 62 and 63, the cylinders 62 and 63 being preferably coaxial at opposite sides of the reservoir 61. The reservoirs 46 and 61 are interconnected in fluid-interchange relationship by means of a conduit 64. The motor unit housing 60 carries for reciprocation therein a double-ended piston 65 which has a pair of opposite end or plunger portions 66 and 67 operating respective in the cylinders 62 and 63. The intermediate portion of the piston 65 is provided with a yoke 68 which, by means of an arm and roller 69 and 70, effects oscillation of a shaft 71. One end of the shaft 71 projects to a point outside the housing 60 and is keyed or otherwise secured to a driving arm 72. This arm is in turn connected by a pitman 73 to the knife head 42 on the knife or sickle 41. Reciprocation of the piston 65 is thus transmitted to the cutting mechanism of the mower.

The transmitter housing 45 is so constructed that the cylinders 51 and 52 communicate respectively with chambers or ports 75 and 76. Similarly, the housing 60 includes chambers 77 and 78 which communicate respectively with the cylinders 62 and 63. The cylinder 51 and chamber 75 are connected by the conduit 37 to the motor chamber 77 and motor cylinder 62. A similar connection is effected by the conduit 38 between the cylinder 52, chamber 76, chamber 78 and cylinder 62. The design is preferably such that the parts are proportioned as illustrated; that is, the displacement of the pistons 54, 55, 66 and 67 is the same. At one side of the two units, the cylinders 51 and 52, the chambers 75 and 77 and the conduit 37 provide a normally closed circuit which contains a fixed volume of fluid for effectively connecting the pistons 53 and 65, so that movement of the piston 53 to the left, for example, will result in displacement of the piston 65 to the right. Likewise, a second independent normally closed circuit containing a fixed volume of fluid is provided by the cylinders 62 and 63, the chambers 76 and 78 and the conduit 38, whereby movement of the piston 53 to the right will result in displacement of the piston 65 to the left. It will be understood, of course, that alternate displacement of the piston 65 to the right and left by means of the piston 53 occurs at relatively high speeds, since the driving means 56—57 for the piston 53 is connected to the tractor power take-off shaft, the normal operating speed of which is between 500 and 600 R. P. M.

The housing 45 is provided with a pair of removable plugs 80 and 81 respectively in the circuits including the conduits 37 and 38. These plugs may be removed for the purpose of initially filling these circuits, in addition to which the reservoirs 46—61 are filled. The plugs 80 and 81 may be removed to vent the circuits.

According to the present invention, it is an important feature to provide means for maintaining the fixed volume of fluid in the circuit 37 or 38. For this purpose, the system includes a pair of make-up or replenishing means, indicated generally at 83 and 84. The means 83 preferably includes a passage 84 communicating with the reservoir 46, a passage 85 communicating with the chamber 75, and a check valve 86 controlling communication between the passages 84 and 85, the check valve 86 being normally closed against the transmission of fluid from the reservoir 46 to the circuit including the conduit 37. The arrangement is such that the check valve 86 will open in response to a decrease of pressure in the circuit 37 below that in the reservoir 46, whereupon the circuit 37 may be replenished by fluid from the reservoir. A similar result is obtained by passages 87 and 88 and a check valve 89 between the reservoir 46 and the chamber 76.

Another feature of the invention is the provision of overload or relief valves, designated here at 90 and 91, there being one for each circuit 37 and 38. The valve means 90 includes a check valve 92 normally biased to close a port 93 communicating with the chamber 77. The closure of the port 93 by the check valve 92 disconnects the port 93 normally from a passage 94 which leads to the motor reservoir 61. In the event of an abnormal pressure rise in the circuit 37, the valve 92 may open to allow excess pressure to be exhausted through the port 93 and passage 94 to the reservoir 61. A similar arrangement is provided for the other circuit 38, the valve 91 including a check valve 95 which controls communication between a port 96 in the chamber 78 and a passage 97 which leads to the reservoir 61.

In order that the piston 65 may reciprocate in the cylinders 62 and 63 with a minimum of adverse vibratory effect, there is provided hydraulic cushioning means at opposite ends of the piston. To this end, the inner end of the cylinder 62 is provided with a counterbore 100 in communication via bypass ports 101 and 102 with the reservoir 61. The counterbore 100 receives a plunger portion 103 provided as an integral part of the left hand portion of the intermediate part of the piston 65, so that, when the piston 65 moves to the left, the portion 103 will enter the counterbore 100, thus forcing fluid through the ports 101 and 102 and providing a hydraulic cushion. A similar arrangement is provided at the other side of the intermediate part of the piston for accomplishing similar results when the piston 65 moves to the right, these components being designated at 105, 106, 107 and 108 and corresponding respectively to the components, 100, 101, 102, and 103. As shown in Figure 2, the adaptation of the units 35 and 36 to the mower enables the use of flexible conduits such as hoses for the conduits 37, 38 and 64. Such flexible conduits readily accommodate variations in the relative positions of the cutter bar or frame 15 with respect to each other or with respect to the tractor.

The operation of the system may be summarized briefly as follows: Initially, the circuits 37 and 38 contain a fixed volume of fluid determined for each circuit by the size of the conduit 37 (38) and associated chambers and cylinders. The reservoir means 46—64—61 will also contain a quantity of fluid which will be held under pressure by the plunger 48 and the relatively light spring 49. During normal operation of the system, pressure in either circuit 37 or 38 may drop because of leakage of fluid or for other reasons. In such event, the appropriate replenishing valve will operate to supply the necessary additional quantity of fluid to the efficient circuit. In the event that the knife 41 becomes jammed so as to prevent reciprocation of the piston 65, the pressure in one of the circuits 37 or 38 will increase abnormally; for example, let it be assumed that the knife 41 is accidentally jammed in the position shown in the drawing, thus temporarily locking the piston 65 in the position shown; in such case, movement of the piston 53 to the right will increase the pressure in the circuit 38, whereupon the overload valve 91 will operate to allow this pressure to be exhausted to the reservoir 61. Simultaneously with the movement of the piston 53 to the right, which increases pressure in the circuit 38, there will occur a decrease in pressure in the circuit 37, whereupon the replenishing valve 83 will operate to supply additional fluid to the deficient circuit. Then, when the piston 53 moves again to the left there will be an abnormal volume of fluid in the circuit 37, which will result in an abnormal pressure rise followed by opening of the overload valve 90 and exhausting of the excess pressure to the reservoir 61. At the same time, the pressure in the circuit 38 will drop and the replenishing valve 84 will operate to supply additional fluid to the deficient circuit 38. In short, fluid will circulate relatively freely through the valves 83 and 84 and relief valves 90 and 91 as long as there is some condition that prevents reciprocation of the piston 65. In this connection, it should be noted that the springs in the replenishing valves 83 and 84 are relatively lighter than the springs in the relief valves 90 and 91, for obvious reasons.

The foregoing description of the preferred embodiment of the invention is not intended to exclude various changes in the proportions and dispositions of the parts, since the embodiment of the invention disclosed is susceptible to many modifications and alterations, all of which may be made without departing from the spirit and scope of the invention as defined in the appended claims.

What is claimed is:

1. Fluid-pressure apparatus, comprising: a transmitter unit and a motor unit, each including a housing provided with a fluid reservoir and a pair of opposed cylinders, each unit further including a double-ended piston carried by the housing of said unit for reciprocation, opposite ends of the piston operating respectively in the cylinders of said unit; means carried by the transmitter unit housing and connected to the transmitter piston for reciprocating said piston; a pair of fluid-pressure-transmitting conduits respectively connecting the cylinders of the transmitter unit to the cylinders of the motor unit, each conduit and its associated transmitter cylinder and motor cylinder providing a normally closed, independent fluid-pressure circuit of fixed volume, so that reciprocation of the transmitter piston effects reciprocation of the motor piston; power take-off means carried by the motor unit housing and connected to the motor piston; means in the transmitter unit housing for applying pressure to the fluid in the transmitter unit reservoir; means interconnecting the reservoirs for fluid interchange therebetween; a pair of fluid-replenishing means, one between the transmitter unit reservoir and each conduit, each of said means including a normally closed valve arranged to open in response to decrease of pressure in the associated conduit below that of said transmitter unit reservoir; and a pair of fluid-pressure-relief valves, one between the motor unit reservoir and each conduit and normally closed but operative to open in response to abnormal pressure rise in such conduit to exhaust to said motor unit reservoir.

2. Fluid-pressure apparatus, comprising: a transmitter unit and a motor unit, each including a housing provided with a fluid reservoir and a pair of opposed cylinders, each unit further including a double-ended piston carried by the housing of said unit for reciprocation, opposite ends of the piston operating respectively in the cylinders of said unit; means carried by the transmitter unit housing and connected to the transmitter piston for reciprocating said piston; a pair of fluid-pressure-transmitting conduits respectively connecting the cylinders of the transmitter unit to the cylinders of the motor unit, each conduit and its associated transmitter cylinder and motor cylinder providing a normally closed, independent fluid-pressure circuit of fixed volume, so that reciprocation of the transmitter piston effects reciprocation of the motor piston; power take-off means carried by the motor unit housing and connected to the motor piston; means in one housing for applying pressure to the fluid in the reservoir of that housing; means interconnecting the reservoirs for fluid interchange therebetween; a pair of fluid-replenishing means, one between one reservoir and each conduit, each of said means including a normally closed valve arranged to open in response to decrease of pressure in the associated conduit below that of said reservoir; and a pair of fluid-pressure-relief valves, one between one of the reservoirs and each conduit and normally closed but operative to open in response to abnormal pressure rise in such conduit to exhaust to said reservoir.

3. Fluid-pressure apparatus, comprising: a transmitter and a motor, each including a fluid reservoir and a pair of opposed cylinders, each further including a double-ended piston carried for reciprocation, opposite ends of the piston operating respectively in the cylinders; means carried by the transmitter and connected to the transmitter piston for reciprocating said piston; a pair of fluid-pressure-transmitting conduits respectively connecting the cylinders of the transmitter to the cylinders of the motor, each conduit and its associated transmitter cylinder and motor cylinder providing a normally closed, independent fluid-pressure circuit of fixed volume, so that reciprocation of the transmitter piston effects reciprocation of the motor piston; power take-off means carried by the motor and connected to the motor piston; means interconnecting the reservoirs for fluid interchange therebetween; a pair of fluid-replenishing means, one between one reservoir and each conduit, each of said means including a normally closed valve arranged to open in response to decrease of pressure in the associated conduit below that of said reservoir; and a pair of fluid-pressure-relief valves, one between one of the reservoirs and each conduit and normally closed but operative to open in response to abnormal pressure rise in such conduit to exhaust to said reservoir.

4. A hydraulic power unit, comprising: a transmitter having a housing providing a fluid reservoir and a pair of opposed cylinders communicating with and extending from said reservoir, a pair of pistons respectively in said cylinders, and rotary input means in the reservoir connected to reciprocate said pistons; a motor having a housing providing a fluid reservoir and a pair of opposed cylinders communicating therewith and extending therefrom, pistons respectively in the motor cylinders, and rotary output means in the motor reservoir and operatively connected to the motor pistons; fluid-transmitting conduits respectively connecting the transmitter cylinders to the motor cylinders; fluid make-up means connected between the transmitter reservoir and each of the conduits; pressure-relief means connected between each conduit and the motor reservoir; and a fluid-transmitting conduit separate from the aforesaid conduits and interconnecting the reservoirs.

5. A hydraulic power unit, comprising: a transmitter having a housing providing a fluid reservoir and a pair of opposed cylinders communicating with and extending from said reservoir, each of said cylinders having at its outer end remote from said reservoir a fluid port formed in the housing, a pair of pistons respectively in said cylinders for alternately discharging and receiving fluid respectively through said ports, rotary input means in the reservoir and operatively connected to reciprocate said pistons, and fluid make-up means between the reservoir and said ports, including a pair of passages formed in said housing and respectively by-passing the pistons and communicating the reservoir and said ports; a motor having a housing providing a fluid reservoir and a pair of opposed cylinders communicating therewith and extending therefrom, each of said motor cylinders having a fluid port at its outer end remote from said motor reservoir, pistons respectively in the motor cylinders, and rotary output means in the motor reservoir and operatively connected to the motor pistons; fluid-transmitting conduits respectively connecting the transmitter ports to the motor ports; pressure-relief means in the motor housing including a pair of passages respectively by-passing the motor pistons and connecting the motor reservoir to the motor ports; and a fluid-transmitting conduit separate from the aforesaid conduits and interconnecting the reservoirs.

JESSE G. LINDEMAN.

REFERENCES CITED

The following references are of record in the file of this patent:

UNITED STATES PATENTS

| Number | Name | Date |
|---|---|---|
| 568,736 | Brown | Oct. 6, 1896 |
| 1,301,485 | Mueller | Apr. 22, 1909 |
| 1,939,851 | Horste | Dec. 19, 1933 |
| 2,109,114 | Kerr | Feb. 22, 1938 |
| 2,205,046 | Nardone | June 18, 1940 |
| 2,286,661 | Warner | June 16, 1942 |
| 2,420,406 | Andrews | May 13, 1947 |
| 2,437,821 | Hughes | Mar. 16, 1948 |
| 2,443,312 | Geiger | June 15, 1948 |

FOREIGN PATENTS

| Number | Country | Date |
|---|---|---|
| 242,162 | Great Britain | Nov. 5, 1926 |